United States Patent [19]
Bergman

[11] 4,206,548
[45] Jun. 10, 1980

[54] MEASURING TOOL FOR TAPER BORES

[75] Inventor: Per Bergman, Surte, Sweden

[73] Assignee: Aktiebolaget SKF, Gothenburg, Sweden

[21] Appl. No.: 960,669

[22] Filed: Nov. 14, 1978

[30] Foreign Application Priority Data

Nov. 16, 1977 [SE] Sweden .................. 7712914

[51] Int. Cl.² .................... G01B 5/24; G01B 3/56; G01B 3/18
[52] U.S. Cl. .................. 33/174 E; 33/164 C; 33/167; 33/DIG. 1
[58] Field of Search ........... 33/147 K, 143 G, 164 C, 33/167, 174 E, 174 Q, 174 M, 180 R, DIG. 1

[56] References Cited

U.S. PATENT DOCUMENTS

| | | | |
|---|---|---|---|
| 1,060,634 | 5/1913 | Rosen | 33/174 M |
| 1,559,801 | 11/1925 | Steinle | 33/164 C |
| 1,639,580 | 8/1927 | Thompson | 33/DIG. 1 |
| 1,643,570 | 9/1927 | Bartholdy | 33/174 E |

FOREIGN PATENT DOCUMENTS

| | | | |
|---|---|---|---|
| 352596 | 5/1922 | Fed. Rep. of Germany | 33/143 G |
| 1202272 | 8/1970 | United Kingdom | 33/174 E |
| 197985 | 8/1967 | U.S.S.R. | 33/174 E |

*Primary Examiner*—Richard R. Stearns
*Attorney, Agent, or Firm*—Eugene E. Renz, Jr.

[57] ABSTRACT

A tool for measuring different details of conical bores comprising a straight elongated member adapted for close engagement against the wall surface of the bore, and having at one end a stop for limiting the length to which the said straight, elongated member can be pushed into the bore and at a predetermined distance from said stop an opening wherein a measuring arm can be pivotably fitted.

4 Claims, 3 Drawing Figures

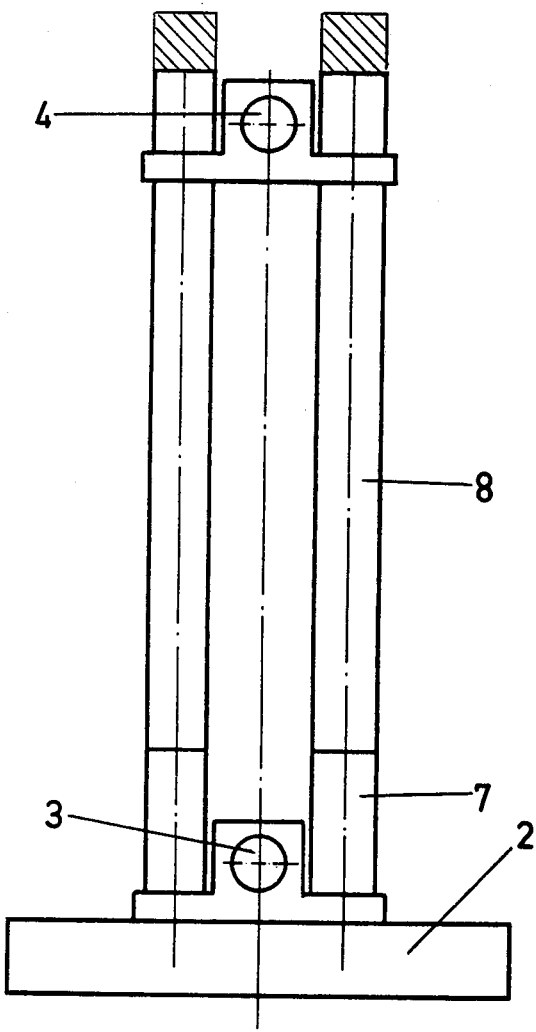
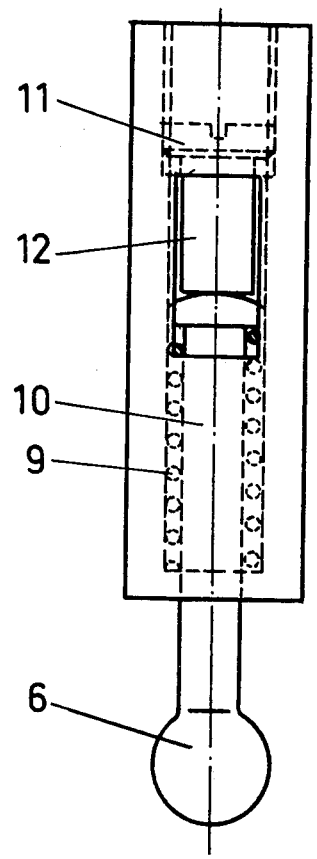
FIG. 2
FIG. 3

MEASURING TOOL FOR TAPER BORES

BACKGROUND OF THE INVENTION

The present invention refers to a device for measuring taper bores and it particularly refers to a measuring tool, which is light and handy and which can be carried to a production machine as well as to a mounting place.

At production of taper bores and at mounting of devices incorporating taper bores it is necessary to make certain measurements, such as measuring the bore diameter, i.e. the largest and the smallest diameter of the taper bore and the conicity of the bore. It is generally necessary to control the parts in a taper joint prior to a mounting. Improperly made tapers will jeopardize the strength of the joint and it can also make impossible a normal dismounting, which can result in damages on the often expensive joint concerned.

A known method for measuring the above mentioned values at taper bores is based thereon that the part which shall be entered into the taper prior to its introduction is provided with a layer of colour, whereupon it is possible to see where the part engages the taper wall, other methods are to use cones with measuring instruments or so called gauge rods, which are controlled in stationary control apparatuses. All these methods are complicated and it is necessary to have heavy and cumbersome equipment for utilizing them. It is thus for instance necessary when measuring by means of gauge rods to use a stationary control apparatus in order to be able to set the measuring instrument of the gauge rod to zero.

The taper bores, which are often measured are for instance bores in couplings, roller shells, propeller hubs, bearing inner rings, sleeves in bearing assemblies etc. The above mentioned devices are not particularly suited for measuring such bores especially at a work site. This is a primarily due to the fact that they are stationary, heavy and comparatively limited. They are furthermore expensive.

SUMMARY OF THE INVENTION

By means of the invention the problems of the mentioned devices have been solved and a measuring tool has been obtained for taper bores, which is characterized thereby that it incorporates a stop for engagement against the side plane of the bore and a ruler-like device extending into the taper bore and being provided with apertures located at certain distances from the side plane for introduction of a measuring arm, such as a micro-meter screw or the like.

The ruler-like device can according to the invention be a fixed ruler having a number of apertures or it can be an extensible ruler thus that it can be set at different lengths.

According to the invention the stop engaging against the side plane ought to be provided with magnets or another attachment device for retention of the ruler in desired position.

The stop which engages against the side plane is preferably adjustably supported on the ruler member so that the ruler has capability of measuring bores of different conicity. It is also possible to use several exchangeable stops having different inclination angles relative to the ruler part.

The measuring arm which shall be arranged on the ruler is according to the invention provided with a ball tip for insertion into the apertures in the ruler. In this manner it is possible that the measuring arm, which usually consists of a micro-meter screw, can be pivoted about its attachment point on the taper.

In order to simplify the adjustment of the measuring arm it is possible that its ball tip is spring loaded and can be adjusted by means of gauge blocks.

BRIEF DESCRIPTION OF THE DRAWINGS

The invention will hereinafter be further described with reference to the accompanying drawings, in which:

FIG 2. shows the measuring ruler according to the invention as seen from above; and FIG. 3 shows the ball tip of the measuring arm with spring and gauge blocks.

DESCRIPTION OF THE PREFERRED EMBODIMENTS

Figure 1:
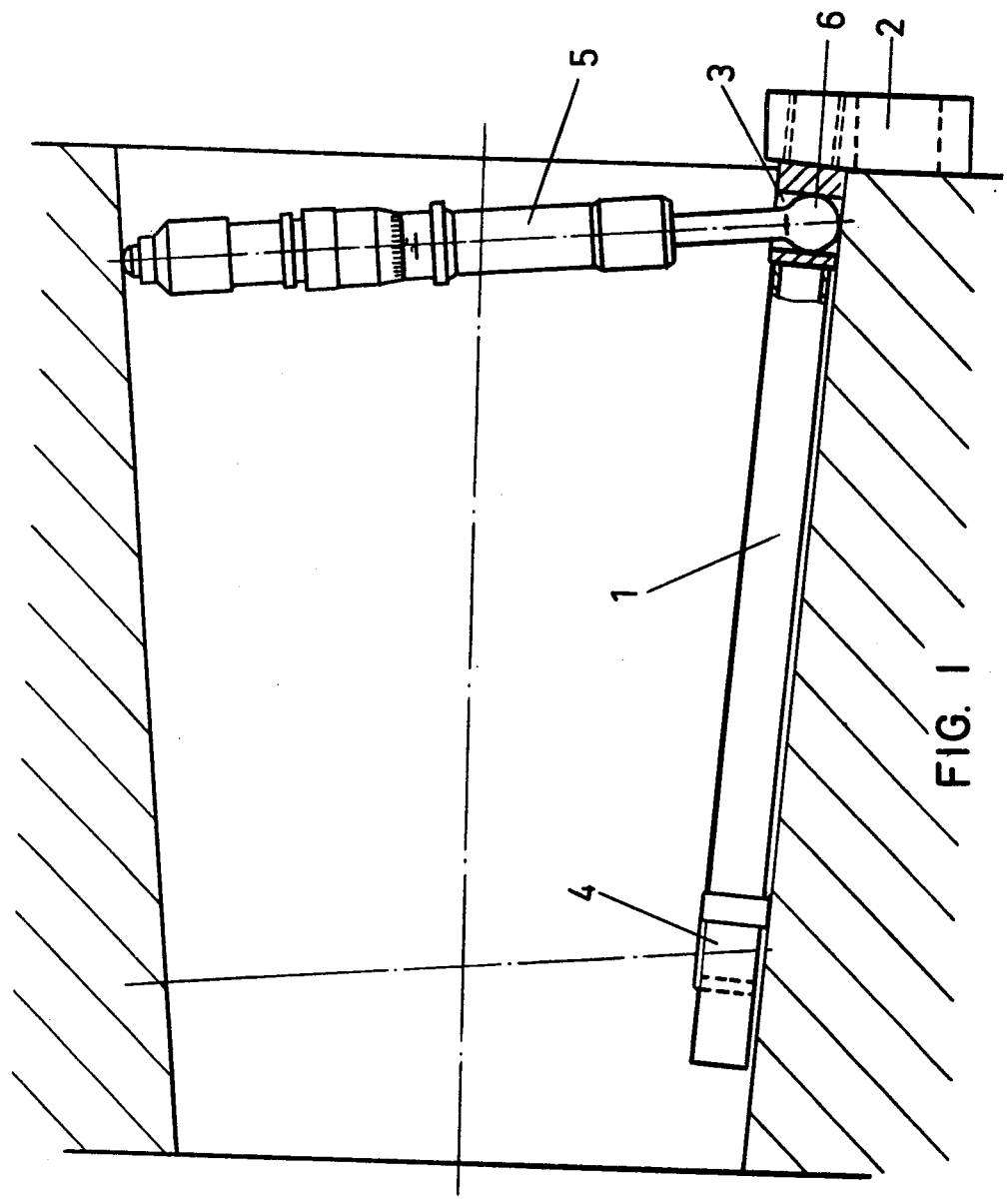
FIG. 1 shows a taper bore with a measuring tool acording to the invention, partly in section.

FIG. 1 shows the measuring tool with a ruler part 1 and a stop 2. This stop is in the present case screwed to the ruler part 1 and forms an angle with the latter, which angle corresponds to the conicity. An aperture 3 is arranged in the ruler at a predetermined distance from the stop. As shown in the figure there is a similar aperture 4 farther out on the ruler. A micro-meter screw 5 is inserted in the aperture 3. The micro-meter screw 5 has instead of its usual tip been provided with a ball tip 6, whereby the micro-meter can be pivoted about this end.

The micrometer screw measures the distance perpendicular to the surface of the taper, thus simplifying measurement of the diameter of the bore. For example, by measuring this distance and knowing the exact distance from the ball tip to the side plane it is easy to calculate the bore diameter, i.e. the largest diameter of the taper bore. If the conicity shall be measured the micro-meter 5 is inserted in the aperture 4 and the distance perpendicularly against the bore wall is measured also there. When knowing the length of the ruler and the distance between the apertures 3 and 4 it is easy to calculate the conicity of the bore. Such calculations can of course be made once for all for different imagined bores and it is possible to have these values written down in a table.

As different bores have different lengths it is advantageous that the ruler part 1 is composed of different parts thus that it can be extended to different lengths. This is most clearly seen in FIG. 2, where the ruler part 1 is divided in parts 7 and 8, which are screwed to each other.

Measurement pieces having apertures such as 3 and 4 can be introduced between fixed distance pieces such as 7 and 8 of equal or different lengths if it is desirable to measure at several points of the taper.

As mentioned above the stop 2 can be provided with magnets or it can be made magnetic in order positively to engage against the side plane during the measurement operation.

The measuring arm, which is usually a micro-meter screw 5, but which can also be a measuring arm e.g. having a measuring instrument, can be divided in pieces, whereby different lengths can be obtained. The ball tip, which is further shown in FIG. 3 can be provided with a load spring 9, which presses the end of the rod 10 on which the ball 6 is fixed against a stop 11. If two values shall be measured and a certain difference is expected between these values it is therefore possible to put a gauge block 12 against the stop 11 and the rod 10, whereby it is not necessary to make any adjustment for measuring the higher value after the lower value has been measured. The very measurement will hereby be reduced to a control of the existence of the expected measuring values only.

The measuring tool according to the present invention can easily be dismounted and it can be stowed away in a box and it can be mounted and operated with a few hand grips only. It is therefore particularly suited for installers but it can also advantageously be used for more stationary measurements.

The invention is not limited to the embodiments shown but can be varied in different ways within the scope of the appended claims.

What is claimed is:

1. A measuring tool for taper bores comprising an elongated ruler member, at least one stop member at one end of said ruler member abutting the side plane of the taper bore forming an angle therewith corresponding to the conicity of the bore, means defining at least a pair of openings in said ruler member spaced apart a predetermined distance, a micrometer with a spherical tip at one end engageable in said opening to allow pivotal movement of said micrometer thereby to measure the distance perpendicularly to the surface of said taper at each opening in said ruler member, said measurements and the known distances from the spherical tip to the side plane and the distance between said openings permitting accurate calculation of taper bore diameter and conicity.

2. A measuring tool according to claim 1 wherein said ruler member is extendable longitudinally for different measure lengths.

3. A measuring tool as claimed in claim 1 wherein said stop engaging the side plane is provided with magnets for retention of the ruler member in a desired position in the taper bore.

4. A measuring tool as claimed in claim 1 wherein the spherical tip of the micrometer is spring loaded and is adjustable by means of gauge blocks.

* * * * *